(12) United States Patent
Matsumura (10) Patent No.: US 11,264,182 B2
(45) Date of Patent: Mar. 1, 2022

(54) POSITIVE ELECTRODE FOR ELECTROCHEMICAL DEVICE, AND ELECTROCHEMICAL DEVICE PROVIDED THEREWITH

(71) Applicant: Panasonic Intellectual Property Management Co., Ltd., Osaka (JP)

(72) Inventor: Nao Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 16/490,570

(22) PCT Filed: Mar. 28, 2018

(86) PCT No.: PCT/JP2018/012674
§ 371 (c)(1),
(2) Date: Sep. 2, 2019

(87) PCT Pub. No.: WO2018/181441
PCT Pub. Date: Oct. 4, 2018

(65) Prior Publication Data
US 2019/0385798 A1  Dec. 19, 2019

(30) Foreign Application Priority Data
Mar. 31, 2017 (JP) .............................. JP2017-072862

(51) Int. Cl.
*H01G 11/48* (2013.01)
*H01G 11/62* (2013.01)
(Continued)

(52) U.S. Cl.
CPC ............. *H01G 11/48* (2013.01); *H01G 11/62* (2013.01); *H01M 4/137* (2013.01); *H01M 4/602* (2013.01);
(Continued)

(58) Field of Classification Search
CPC ... H01G 11/62; H01G 11/48; H01M 10/0568; H01M 10/052; H01M 4/602; H01M 4/137
See application file for complete search history.

(56) References Cited

U.S. PATENT DOCUMENTS

| 5,137,991 A * | 8/1992 | Epstein | .................. | G11B 7/244 |
| | | | | 525/540 |
| 2002/0086206 A1 * | 7/2002 | Fauteux | .................. | H01M 4/13 |
| | | | | 429/215 |

(Continued)

FOREIGN PATENT DOCUMENTS

| CN | 103765657 A | 4/2014 |
| CN | 104871351 A | 8/2015 |

(Continued)

OTHER PUBLICATIONS

International Search Report of PCT application No. PCT/JP2018/012674 dated May 29, 2018.

(Continued)

*Primary Examiner* — David M Sinclair
(74) *Attorney, Agent, or Firm* — McDermott Will and Emery LLP (57) ABSTRACT

An electrochemical device includes a positive electrode and a negative electrode. The positive electrode for the electrochemical device includes a positive current collector, and an active layer including a conductive polymer disposed on the positive current collector. The conductive polymer contains a polyaniline or a derivative of polyaniline. An infrared absorption spectrum of the active layer exhibits a first peak derived from a quaternized nitrogen atom of the polyaniline or the derivative of polyaniline, and a second peak derived from a benzenoid structure of the polyaniline or the derivative of polyaniline. And a ratio of an absorbance of the first (Continued)

peak to an absorbance of the second peak is more than or equal to 0.3.

5 Claims, 4 Drawing Sheets

(51) Int. Cl.
*H01M 4/137* (2010.01)
*H01M 4/60* (2006.01)
*H01M 10/0568* (2010.01)
*H01M 4/02* (2006.01)

(52) U.S. Cl.
CPC .. *H01M 10/0568* (2013.01); *H01M 2004/028* (2013.01)

(56) References Cited

U.S. PATENT DOCUMENTS

2005/0230668 A1* 10/2005 Lee .................... C08G 73/0266 252/500
2014/0186703 A1 7/2014 Ando et al.
2014/0220438 A1 8/2014 Abe et al.
2015/0303475 A1 10/2015 Abe et al.
2017/0317345 A1 11/2017 Abe et al.

FOREIGN PATENT DOCUMENTS

| | | | |
|---|---|---|---|
| CN | 105958011 A | 9/2016 | |
| EP | 1833065 A1 * | 9/2007 | ............ H01G 11/38 |
| JP | 1-194266 | 8/1989 | |
| JP | 2013-232388 | 11/2013 | |
| JP | 2014-130706 | 7/2014 | |
| JP | 2014-139927 | 7/2014 | |

OTHER PUBLICATIONS

English Translation of Chinese Office Action dated Nov. 19, 2021 for the related Chinese Patent Application No. 201880020689.0.

* cited by examiner

POSITIVE ELECTRODE FOR ELECTROCHEMICAL DEVICE, AND ELECTROCHEMICAL DEVICE PROVIDED THEREWITH

CROSS-REFERENCE TO RELATED APPLICATIONS

This application is a U.S. national stage application of the PCT International Application No. PCT/JP2018/012674 filed on Mar. 28, 2018, which claims the benefit of foreign priority of Japanese patent application 2017-072862 filed on Mar. 31, 2017, the contents all of which are incorporated herein by reference.

TECHNICAL FIELD

The present invention relates to a positive electrode for an electrochemical device, which includes an active layer including a conductive polymer, and an electrochemical device including the positive electrode.

BACKGROUND

In recent years, attention has been paid to an electrochemical device having performances intermediate between a lithium ion secondary battery and an electric double layer capacitor. Investigations have been made, for example, about use of a conductive polymer as a positive electrode material (see Unexamined Japanese Patent Publication No. 2014-130706). Since electrochemical devices including, as a positive electrode material, a conductive polymer are charged and discharged by adsorption of anions (doping) and desorption of the anions (dedoping), these devices are small in reaction resistance. Thus, the electrochemical devices exhibit a higher output power than general lithium ion secondary batteries.

SUMMARY

In a case where polyanilines including polyaniline or a derivative of the polyaniline is used as the conductive polymer, the float property is likely to be declined in float charging that a constant voltage is continuously applied to the electrochemical device.

An aspect of the present invention relates to a positive electrode for an electrochemical device. The positive electrode includes a positive current collector, and an active layer including a conductive polymer disposed on the positive current collector. The conductive polymer contains a polyaniline or a derivative of polyaniline. An infrared absorption spectrum (hereinafter, referred to as an IR spectrum) of the active layer exhibits a first peak and a second peak. The first peak is derived from a quaternized nitrogen atom of the polyaniline or the derivative of polyaniline. The second peak is derived from a benzenoid structure of the polyaniline or the derivative of polyaniline. And a ratio of an absorbance of the first peak to an absorbance of the second peak is more than or equal to 0.3.

Another aspect of the present invention relates to an electrochemical device. The electrochemical device includes the positive electrode described above, and a negative electrode.

According to the present invention, a decline in float property for an electrochemical device can be suppressed.

DESCRIPTION OF EMBODIMENT

In an electrochemical devices, the use of a conductive polymer as a positive electrode material has been considered. During charging, anions in the electrolytic solution are doped into the conductive polymer, and lithium ions in the electrolytic solution are occluded in a negative electrode material. During discharging, anions dedoped from the conductive polymer move into the electrolytic solution, and lithium ions released from the negative electrode material move into the electrolytic solution. It is to be noted that the present invention includes cases where the conductive polymer exhibits almost no electric conductivity or does not exhibit electric conductivity in a state where anions have been dedoped from the conductive polymer.

In the case of using, as the conductive polymer, polyanilines such as polyaniline and a derivative of polyaniline, when a constant voltage is continuously applied to the electrochemical device by float charging, the capacity of the positive electrode is likely to be decreased.

In a positive electrode for an electrochemical device according to one exemplary embodiment of the present invention, in an active layer including a conductive polymer, the conductive polymer contains polyaniline or a derivative of polyaniline. In addition, an IR spectrum of the active layer exhibits a first peak derived from a quaternized nitrogen atom of the polyaniline or the derivative of polyaniline, and a second peak derived from a benzenoid structure of the polyaniline or the derivative of polyaniline. Further, the ratio ($=I_1/I_2$) of an absorbance (hereinafter, also referred to as $I_1$) of the first peak to an absorbance (hereinafter, also referred to as $I_2$) of the second peak is more than or equal to 0.3. By providing such an active layer, the state of the conductive polymer which contributes to charging/discharging can be maintained. Thus, increase in internal resistance during float charging can be suppressed, and decrease in capacity during float charging can be suppressed. Decline in float property for the electrochemical device can be suppressed.

It is to be noted that the benzenoid structure refers to a moiety structure including two aromatic rings and a —NH— group linking the two aromatic rings in polyaniline or a derivative of polyaniline, which can be represented by —(Ar1-NH—Ar2)—. Here, Ar1 and Ar2 each represent the aromatic ring in the polyaniline or the derivative of polyaniline, and may have a substituent.

The IR spectrum mentioned above may be measured for the active layer at the surface of a sample obtained by adequately washing and drying the positive electrode.

<<Electrochemical Device>>

The electrochemical device according to the present exemplary embodiment includes a positive electrode and a negative electrode. The positive electrode includes a positive current collector and an active layer disposed on the positive current collector. A carbon layer may be disposed on the positive current collector. When a carbon layer is provided, a resistance between the positive current collector and the active layer can be reduced to suppress decrease in capacity. Thus it is an advantageous for restraining decline in float property. The active layer may be disposed on the positive current collector with a carbon layer disposed between the positive current collector and the active layer, or disposed directly on the positive current collector in a case where there is a region with no carbon layer present.

Figure 1:
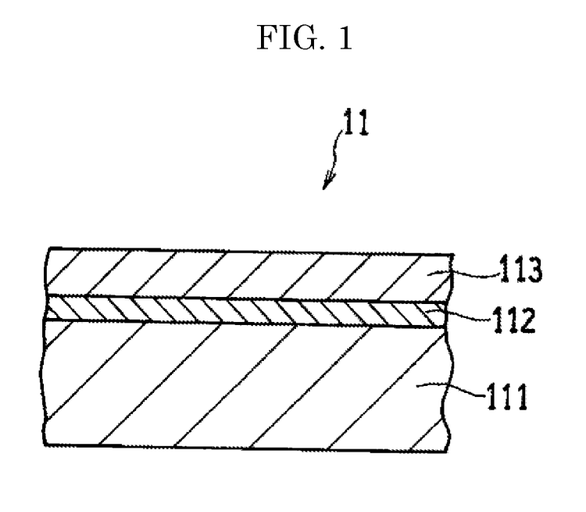
FIG. 1 is a schematic sectional view illustrating a positive electrode for an electrochemical device according to one exemplary embodiment of the present invention.

FIG. 1 shows a schematic cross-sectional view illustrating a positive electrode in the case of including a carbon layer. Positive electrode 11 illustrated as an example includes positive current collector 111, carbon layer 112 disposed on positive current collector 111, and active layer 113 disposed on positive current collector 111 via carbon layer 112 interposed between positive current collector 111 and active layer 113. Active layer 113 includes a conductive polymer containing a polyaniline or a derivative of polyaniline. An IR spectrum of active layer 113 exhibits a first peak derived from a quaternized nitrogen atom of the polyaniline or the derivative of polyaniline, and a second peak derived from a benzenoid structure of the polyaniline or the derivative of polyaniline. Further, the ratio $I_1/I_2$ of the absorbance $I_1$ of the first peak to the absorbance $I_2$ of the second peak is more than or equal to 0.3.

Figure 2:
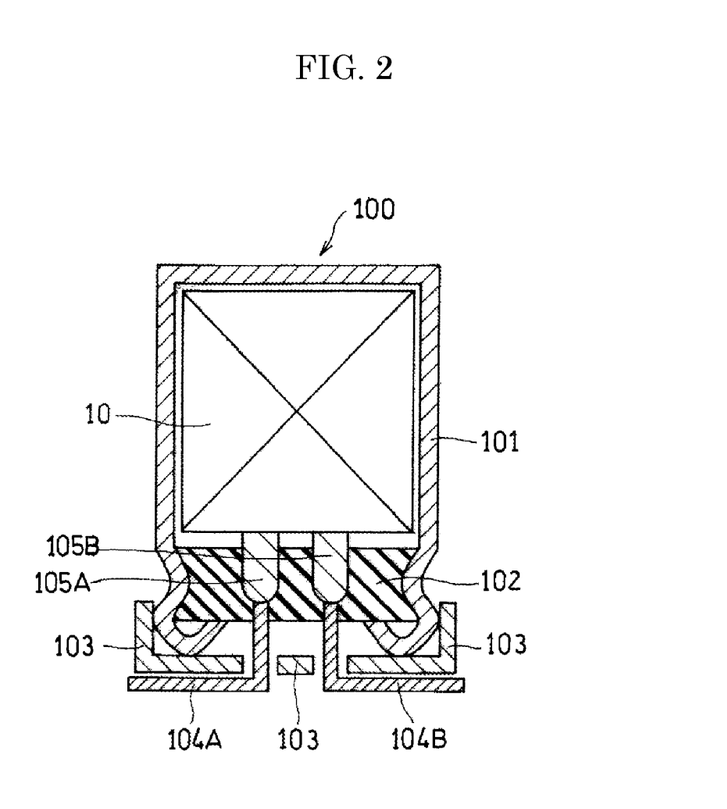
FIG. 2 is a schematic sectional view illustrating an electrochemical device according to one exemplary embodiment of the present invention.
Figure 3:
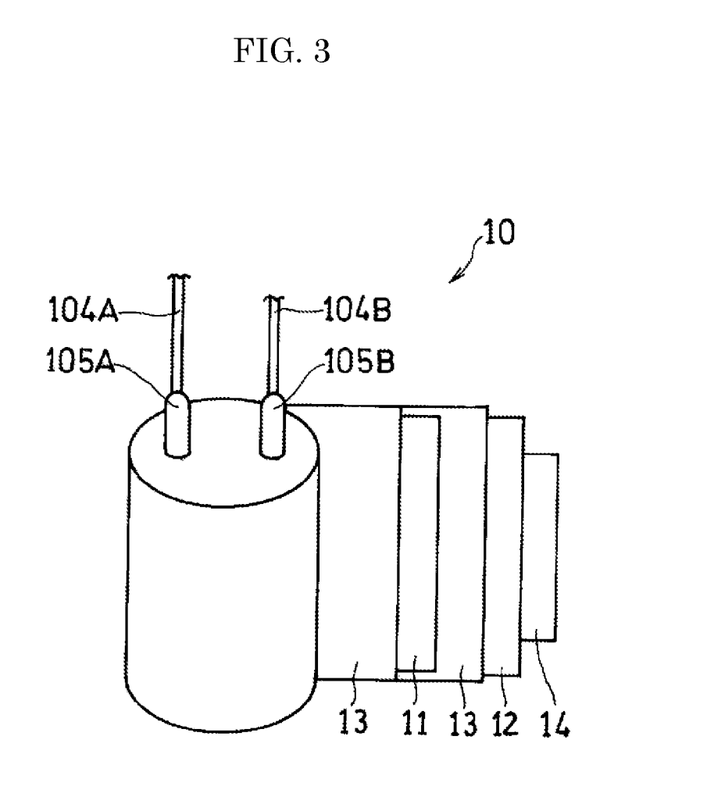
FIG. 3 is a schematic view for illustrating a structure of an electrode group of the electrochemical device in FIG. 2.
Figure 4A:
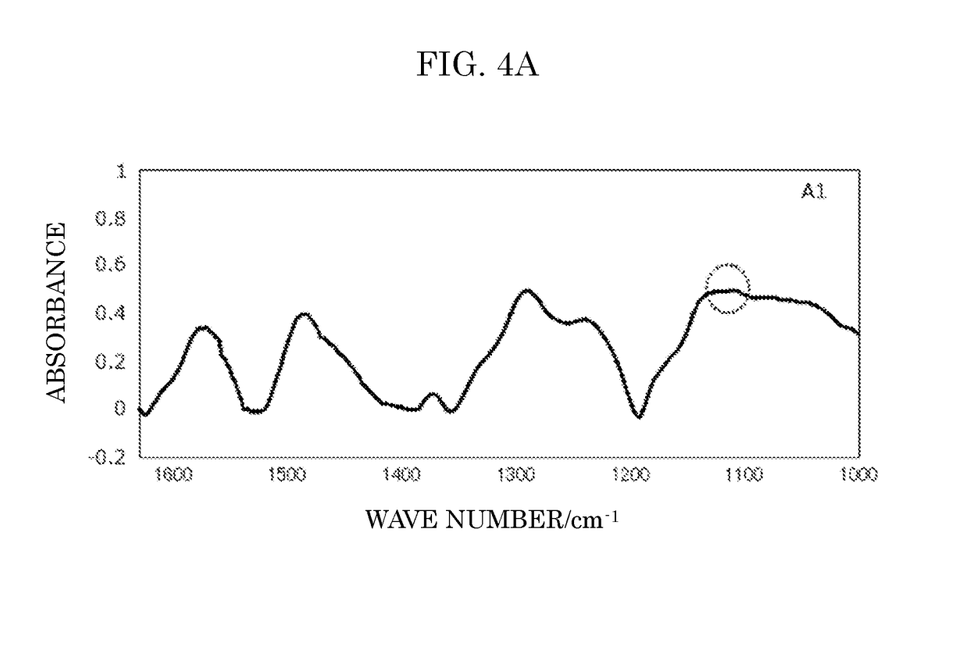
FIG. 4A is an IR spectrum for an active layer of a positive electrode according to Example 1.
Figure 4B:
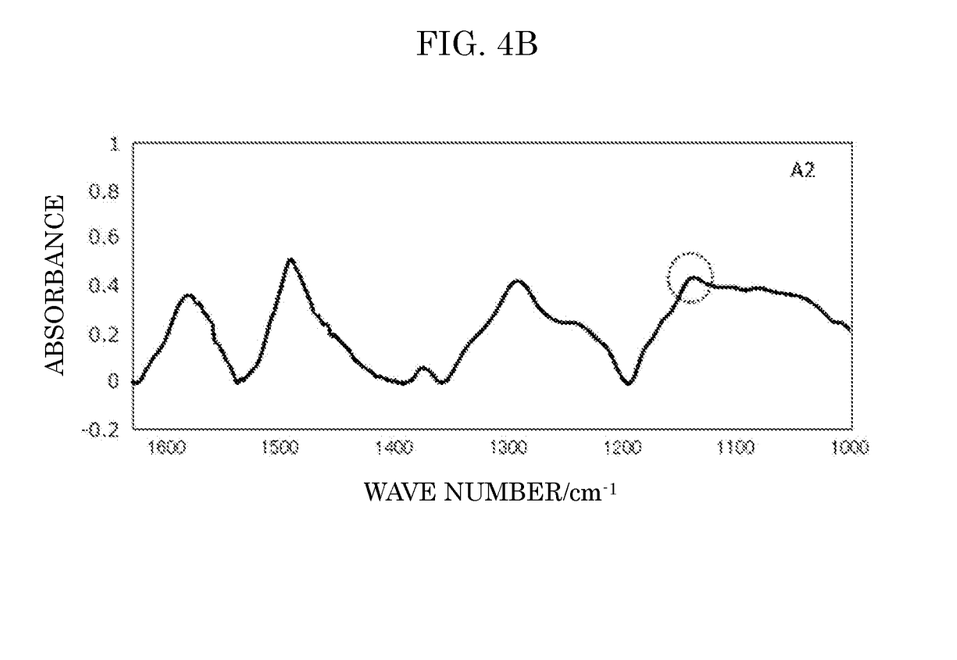
FIG. 4B is an IR spectrum for an active layer of a positive electrode according to Example 2.
Figure 4C:
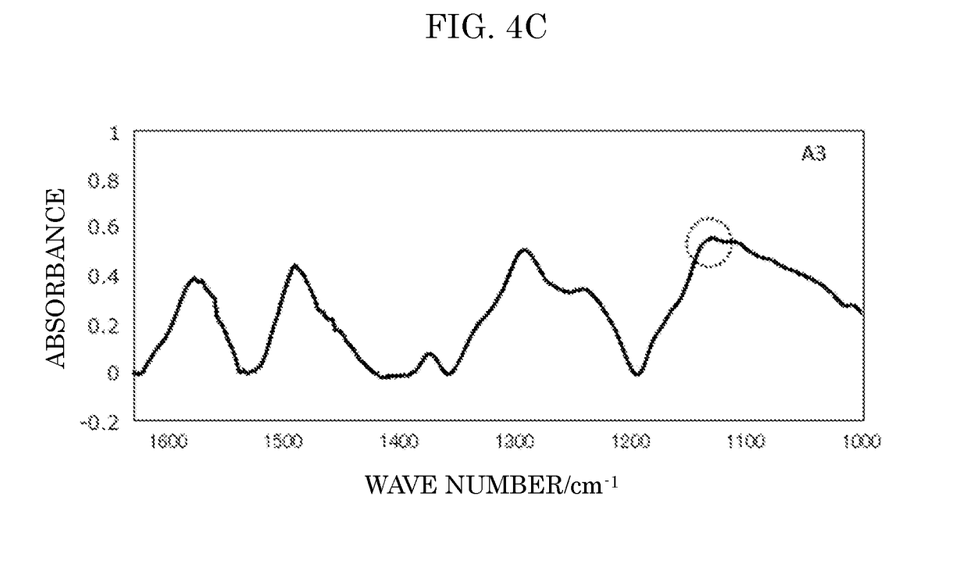
FIG. 4C is an IR spectrum for an active layer of a positive electrode according to Example 3.
Figure 4D:
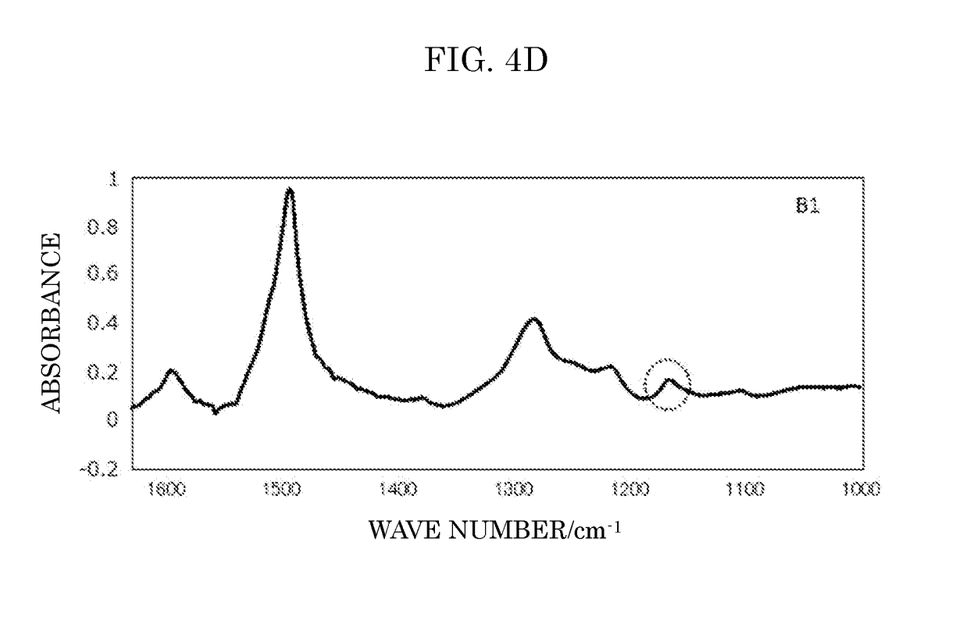
FIG. 4D is an IR spectrum for an active layer of a positive electrode according to Comparative Example 1.

Hereinafter, a configuration of an electrochemical device according to the present invention will be described in more detail with reference to the drawings. FIG. 2 is a schematic sectional view illustrating electrochemical device 100 according to the present exemplary embodiment. FIG. 3 is a schematic developed view of part of electrode group 10 included in electrochemical device 100.

Electrochemical device 100 includes electrode group 10, container 101 which houses electrode group 10, sealing body 102 for sealing an opening of container 101, and base plate 103 covering sealing body 102. Electrochemical device 100 further includes lead wires 104A and 104B which each lead out from sealing body 102 to penetrate base plate 103, and lead tabs 105A and 105B which connect lead wires 104A and 104B to the respective electrodes of electrode group 10. Container 101 is, at its part near an end of the opening, processed inward by drawing, and the opening end is curled to swage sealing body 102. Electrode group 10 includes positive electrode 11 and a negative electrode. Typically, a separator is disposed between positive electrode 11 and the negative electrode.

(Positive Electrode)

The present invention encompasses a positive electrode of an electrochemical device (positive electrode for electrochemical device). Hereinafter, the positive electrode will be described in more detail.

(Positive Current Collector)

As positive current collector 111 of positive electrode 11, for example, a sheet-form metallic material is used. The sheet-form metallic material is, for example, a metal foil piece, a metal porous body, a punched metal, an expanded metal or an etched metal. As a material for positive current collector 111, for example, aluminum, an aluminum alloy, nickel, titanium and the like can be used. The material is preferably aluminum or an aluminum alloy. Positive current collector 111 has a thickness ranging, for example, from 10 µm to 100 µm, inclusive.

(Carbon Layer)

Carbon layer 112 is formed, for example, by vapor-depositing a conductive carbon material onto a surface of positive current collector 111. Alternatively, carbon layer 112 is formed by applying a carbon paste containing a conductive carbon material onto a surface of positive current collector 111 to form a coating film, and then drying the coating film. The carbon paste contains, for example, the conductive carbon material, a polymer material, and water or an organic solvent. Carbon layer 112 may have a thickness ranging, for example, from 1 µm to 20 µm, inclusive.

As the conductive carbon material, graphite, hard carbon, soft carbon, carbon black and the like can be sued. Among these conductive carbon materials, carbon black is preferable because this material easily forms carbon layer 112 that is thin and excellent in electric conductivity. Average diameter D1 of the conductive carbon material is not particularly limited, and ranges, for example, from 3 nm to 500 nm, inclusive, and preferably from 10 nm to 100 nm, inclusive. The average particle diameter is a median diameter (D50) in a volume particle size distribution that is obtained by a laser diffraction particle size distribution measuring apparatus (the same shall apply hereinafter). Average diameter D1 of carbon black may be calculated by an observation through a scanning electron microscope.

The polymer material is not particularly limited, and is preferably, for example, fluororesin, acrylic resin, polyvinyl chloride, polyolefin resin, styrene-butadiene rubber (SBR), or water glass (polymer of sodium silicate) because such a material is electrochemically stable and is excellent in acid resistance.

(Active Layer)

Active layer 113 includes a conductive polymer. In the preparation of active layer 113, a conductive polymer layer is formed first. The conductive polymer layer can be formed, for example, by immersing positive current collector 111 including carbon layer 112 in a reaction liquid containing a raw material for the conductive polymer, and subjecting the raw material to electrolytic polymerization in the presence of positive current collector 111. In the formation of the conductive polymer layer, positive current collector 111 is used as an anode to conduct the electrolytic polymerization. In this way, the conductive polymer layer is formed to cover a surface of carbon layer 112. It is to be noted that in the case of forming no carbon layer 112, positive current collector 111 is immersed in a reaction liquid to conduct the electrolytic polymerization. In this way, the conductive polymer layer is formed to cover the surface of positive current collector 111. Alternatively, the conductive polymer layer may be formed after forming an interposed layer other than the carbon layer.

The conductive polymer layer may be formed by a method other than the electrolytic polymerization. The conductive polymer layer may be formed, for example, by chemical polymerization of the raw material. Alternatively, the conductive polymer layer may be formed with the use of the conductive polymer or a dispersion of the conductive polymer.

According to the present exemplary embodiment, since active layer 113 includes the conductive polymer containing a polyaniline or a derivative of polyaniline, the raw material used in the electrolytic polymerization or the chemical polymerization may be thus a polymerizable compound capable of being polymerized to produce a conductive polymer. Examples of the raw material include a monomer and/or an oligomer. Examples of the raw material monomer include anilines such as aniline or a derivative of aniline. The derivative of aniline means a monomer that has a basic skeleton of aniline. Examples of the raw material oligomer include oligomers of the anilines. These raw materials may be used alone or in combination of two or more raw materials.

Polyanilines are used as the conductive polymer. For example, polyaniline or a derivative of polyaniline can be used as the polyanilines. It is to be noted that the derivative of polyaniline means a monomer that has a basic skeleton of polyaniline. The polyanilines are preferably π-conjugated polymers. The polyanilines may be used alone, or can be used in combination of two or more polyanilines. Weight-average molecular weights of the polyanilines are not particularly limited, and ranges, for example, from 1000 to 100000, inclusive.

The conductive polymer constituting the active layer may contain, besides the polyanilines (also referred to as a first conductive polymer), a conductive polymer (also referred to as a second conductive polymer). However, a ratio of the second conductive polymer is preferably small. A ratio of the first conductive polymer to entirety of conductive polymer constituting the active layer is more than or equal to 90% by mass, preferably more than or equal to 95%. Further, the conductive polymer is preferably constituted by only the polyanilines. As the second conductive polymer, π-conjugated polymers other than the polyanilines can be used, such as, for example, polypyrrole, polythiophene, polyfuran, polythiophene vinylene, polypyridine, or a derivative of any one of these polymers. It is to be noted that derivatives of the π-conjugated polymers mean polymers that have a basic skeleton of a π-conjugated polymer.

The electrolytic polymerization or the chemical polymerization is preferably performed by use of a reaction liquid containing an anion (dopant). Preferably, the dispersion or solution of the conductive polymer also contains a dopant. The polyanilines and other π-conjugated polymers exhibit excellent electric conductivity by doping the polymers with a dopant. For example, in the chemical polymerization, positive current collector 111 may be immersed in a reaction liquid containing a dopant, an oxidizing agent and a raw material monomer. Subsequently, positive current collector 111 is picked out from the reaction liquid, and dried. In the electrolytic polymerization, positive current collector 111 and a counter electrode may be immersed in a reaction liquid containing a dopant and a raw material monomer. By using positive current collector 111 and the counter electrode as an anode and a cathode, respectively, an electric current is flowed between the two electrodes.

As a solvent in the reaction liquid, water may be used. A nonaqueous solvent may be used in consideration of solubility of the monomer. For example, alcohols can be used as the nonaqueous solvent. Examples of the dispersing medium or solvent for the conductive polymer include water and these nonaqueous solvents.

Examples of the dopant include a sulfate ion, a nitrate ion, a phosphate ion, a borate ion, a benzenesulfonate ion, a naphthalenesulfonate ion, a toluenesulfonate ion, a methanesulfonate ion ($CF_3SO_3^-$), a perchlorate ion ($ClO_4^-$), a tetrafluoroborate ion ($BF_4^-$), a hexafluorophosphate ion ($PF_6^-$), a fluorosulfate ion ($FSO_3^-$), a bis(fluorosulfonyl)imide ion ($N(FSO_2)_2^-$), a bis(trifluoromethanesulfonyl)imide ion ($N(CF_3SO_2)_2^-$), an oxalate ion, and a formate ion. These dopants may be used alone or in combination of two or more of these dopants.

The dopant may be a polymer ion. Examples of the polymer ion include ions of polyvinylsulfonic acid, polystyrenesulfonic acid, polyallylsulfonic acid, polyacrylsulfonic acid, polymethacrylsulfonic acid, poly(2-acrylamide-2-methylpropanesulfonic acid), polyisoprenesulfonic acid, and polyacrylic acid. These dopants may be a homopolymer or a copolymer of two or more monomers. These dopants may be used alone or in combination of two or more of these dopants.

Active layer 113 can be formed by reductively treating a positive current collector with a conductive polymer layer formed. The reductive treatment may be carried out by electrochemical reduction or chemical reduction. The reductive treatment can be carried out by, for example, bringing a reductant into contact with the conductive polymer layer, and if necessary, while applying a voltage.

According to the present exemplary embodiment, an IR spectrum of active layer 113 exhibits a first peak derived from a quaternized nitrogen atom of the polyanilines, and a second peak derived from a benzenoid structure of the polyanilines. In this regard, an absorbance of the first peak is higher than an absorbance of the second peak. The ratio $I_1/I_2$ of the absorbance $I_1$ of the first peak to the absorbance $I_2$ of the second peak is more than or equal to 0.3.

In the IR spectrum of the active layer, the positions of the first peak derived from the quaternized nitrogen atom and the second peak derived from the benzenoid structure are not particularly limited. In the IR spectrum of the active layer, the first peak preferably appears at least in a range from 1100 $cm^{-1}$ to 1200 $cm^{-1}$, inclusive. In addition, in the IR spectrum of the active layer, the second peak preferably appears at least in a range from 1450 $cm^{-1}$ to 1550 $cm^{-1}$, inclusive.

In addition, in the IR spectrum of the active layer, the first peak may have an overlap with a peak (third peak) other than the first peak and the second peak. For example, the first peak may have an overlap with a third peak of an anion bonded to or interacting with the quaternized nitrogen atom. The first peak derived from the quaternized nitrogen atom shows the highest peak in the range from 1100 $cm^{-1}$ to 1200 $cm^{-1}$, inclusive.

The ratio ($=I_1/I_2$) of the absorbance $I_1$ of the first peak to the absorbance $I_2$ of the second peak is more than or equal to 0.3, preferably more than or equal to 0.8. When the ratio $I_1/I_2$ is within this range, the state of the polyaniline which contributes to charging/discharging can be maintained. Thus, a high float property is more likely to be secured. The upper limit of the ratio $I_1/I_2$ is not particularly limited, but the ratio $I_1/I_2$ is preferably less than or equal to 3.0.

The ratio $I_1/I_2$ can be adjusted by changing reductive conditions for dedoping from the dopant of the conductive polymer layer. The reductive conditions are, for example, type of the reductant, amount of the reductant, reduction temperature, reduction time and/or a voltage applied for the reduction.

Examples of the reductant include ascorbic acids (ascorbic acid, isoascorbic acid, and salts of the acids), butylhydroxyanisole, hydrazine, aldehydes, formic acid, oxalic acid, and gallic acid. Formaldehyde and glyoxal, as well as aliphatic aldehydes (e.g., acetaldehyde, propionaldehyde, butylaldehyde), alicyclic aldehydes, and aromatic aldenydes may be all used as the aldehydes. Among these reductants, carbonyl group-containing compounds, for example, ascorbic acid and salts of the acid, formic acid, oxalic acid, and gallic acid are preferably used. Above all, carboxy group-containing compounds (for example, formic acid, oxalic acid, gallic acid) are preferably used as the reductant.

It is to be noted that the thickness of active layer 113 can be easily controlled by, for example, appropriately changing the current density or the polymerization time for electrolysis, or adjusting the amount of the conductive polymer deposited on the positive current collector. The thickness of active layer 113 ranges, for example, from 10 μm to 300 μm, inclusive, per surface of the electrochemical device.

(Negative Electrode)

Negative electrode 12 includes, for example, a negative current collector and a negative electrode material layer.

For the negative current collector, for example, a sheet-form metallic material is used. The sheet-form metallic material is, for example, a metal foil piece, a metal porous body, a punched metal, an expanded metal or an etched metal. As a material for the negative current collector, for example, copper, a copper alloy, nickel, or stainless steel can be used.

The negative electrode material layer preferably contains, as a negative electrode active material, a material that electrochemically occludes and releases lithium ions. Examples of such a material include a carbon material, a metal compound, an alloy, and a ceramic material. As the carbon material, graphite, hardly-graphitizable carbon (hard carbon), and easily-graphitizable carbon (soft carbon) are preferable. Graphite and hard carbon are particularly preferable. Examples of the metal compound include silicon oxides and tin oxides. Examples of the alloy include silicon alloys and tin alloys. Examples of the ceramic material include lithium titanate and lithium manganate. These materials may be used alone or in combination of two or more of these dopants. Among these, carbon materials are preferable from the perspective of being able to lower the potential of negative electrode 12.

The negative electrode material layer preferably contains, in addition to the negative electrode active material, a conductive agent, a binder and the like. Examples of the conductive agent include carbon black and a carbon fiber. Examples of the binder include a fluororesin, an acrylic resin, a rubber material, and a cellulose derivative. Examples of the fluororesin include polyvinylidene fluoride, polytetrafluoroethylene, and a tetrafluoroethylene-hexafluoropropylene copolymer. Examples of the acrylic resin include polyacrylic acid and an acrylic acid-methacrylic acid copolymer. Examples of the rubber material include styrene-butadiene rubber, and examples of the cellulose derivative include carboxymethyl cellulose or salts of the carboxymethyl cellulose.

The negative electrode material layer is formed, for example, by preparing a negative electrode mixture paste that contains a mixture of a negative electrode active material, a conductive agent, a binder and others with a dispersion medium, applying the negative electrode mixture paste to the negative current collector, followed by drying.

Negative electrode 12 is preferably pre-doped with lithium ions in advance. Thus, a potential of negative electrode 12 is lowered so that a difference in potential (that is, voltage) between positive electrode 11 and negative electrode 12 increases. Consequently, energy density of electrochemical device 100 is improved.

The pre-doping of negative electrode 12 with lithium ions is advanced, for example, as follows. A metal lithium film that serves as a supply source of the lithium ions is formed on a surface of the negative electrode material layer. And then negative electrode 12 having the metal lithium film is impregnated with an electrolytic solution (for example, a nonaqueous electrolytic solution) having lithium ion conductivity. At this time, lithium ions are eluted from the metal lithium film into the nonaqueous electrolytic solution, and the eluted lithium ions are occluded in the negative electrode active material. For example, when graphite or hard carbon is used as the negative electrode active material, lithium ions are inserted into between layers of graphite or into fine pores of hard carbon. An amount of the lithium ions, with which the negative electrode is to be pre-doped, can be controlled by a mass of the metal lithium film.

The step of pre-doping negative electrode 12 with lithium ions may be performed before electrode group 10 is assembled, or the pre-doping may be advanced after electrode group 10 is housed, together with the nonaqueous electrolytic solution, in case 101 for electrochemical device 100.

(Separator)

As separator 13, for example, the following is preferably used: a nonwoven fabric made of cellulose fiber, a nonwoven fabric made of glass fiber, a microporous membrane made of polyolefin, a fabric cloth, or a nonwoven fabric. Separator 13 has, for example, a thickness ranging from 10 μm to 300 μm, inclusive, and preferably from 10 μm to 40 μm, inclusive.

(Nonaqueous Electrolytic Solution)

Electrode group 10 preferably includes a nonaqueous electrolytic solution.

The nonaqueous electrolytic solution has lithium ion conductivity, and contains a lithium salt and a nonaqueous solvent in which the lithium salt is dissolved. At this time, doping and dedoping of anions of the lithium salt with respect to positive electrode 11 can be reversibly repeated. Meanwhile, reversibly, lithium ions derived from the lithium salt are occluded into negative electrode 12, and released from negative electrode 12.

Examples of the lithium salt include $LiClO_4$, $LiBF_4$, $LiPF_6$ (lithium hexafluorophosphate), $LiAlCl_4$, $LiSbF_6$, $LiSCN$, $LiCF_3SO_3$, $LiFSO_3$, $LiCF_3CO_2$, $LiAsF_6$, $LiB_{10}Cl_{10}$, $LiCl$, $LiBr$, $LiI$, $LiBCl_4$, $LiN(FSO_2)_2$, and $LiN(CF_3SO_2)_2$. These lithium salts may be used alone or in combination of two or more of these lithium salts. Among these lithium salts, at least one selected from the group consisting of lithium salts having an oxo acid anion containing a halogen atom suitable for an anion, and lithium salts having an imide anion is preferably used. From the viewpoints of increasing the ion conductivity of the electrolytic solution and being capable of inhibiting corrosion of metallic parts such as current collectors and leads, an electrolytic solution containing lithium hexafluorophosphate is preferably used.

A concentration of the lithium salt in the nonaqueous electrolytic solution in the charged state (state-of-charge (SOC): 90% to 100%) ranges, for example, from 0.2 mol/L to 5 mol/L, inclusive.

As the nonaqueous solvent, cyclic carbonates such as ethylene carbonate, propylene carbonate, and butylene carbonate; chain carbonates such as dimethyl carbonate, diethyl carbonate, and ethyl methyl carbonate; aliphatic carboxylates such as methyl acetate, methyl propionate, and ethyl propionate; lactones such as γ-butyrolactone and γ-valerolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; and dimethylsulfoxide, 1,3-dioxolane, formamide, acetamide, dimethylformamide, dioxolane, acetonitrile, propionitrile, nitromethane, ethylmonoglyme, trimethoxymethane, sulfolane, methyl sulfolane, and 1,3-propanesultone can be used. These solvents may be used alone, or may be used in combination of two or more of these solvents.

In the nonaqueous electrolytic solution, an additive may be added to the nonaqueous solvent as required. For example, an unsaturated carbonate such as vinylene carbonate, vinyl ethylene carbonate or divinyl ethylene carbonate may be added as an additive for forming a film high in lithium ion conductivity on the surface of negative electrode surface 12.

(Production Method)

Hereinafter, one example of a method for producing electrochemical device 100 of the present invention will be described with reference to FIGS. 2 and 3. However, the method for producing electrochemical device 100 of the present invention is not limited to this example.

Electrochemical device 100 is produced by, for example, a method including the following steps. Carbon layer 112 is formed on positive current collector 111. Active layer 113 including a conductive polymer is formed on positive current collector 111 with carbon layer 112 interposed therebetween to yield positive electrode 11. yielded positive electrode 11, separator 13, and negative electrode 12 are laminated in this order to yield electrode group 10. And yielded electrode group 10 is housed together with a nonaqueous electrolytic solution into container 101.

Carbon layer 112 is formed with the use of, for example, vapor deposition or a carbon paste as described above.

As described above, active layer 113 is formed, for example, by forming a conductive polymer layer and subjecting the conductive polymer layer to a reductive treatment in the presence of positive current collector 111 with carbon layer 112.

To positive electrode 11 yielded as described above is connected a lead member (lead tab 105A having lead wire 104A). To negative electrode 12 is connected another lead member (lead tab 105B having lead wire 104B). Subsequently, separator 13 is interposed between positive electrode 11 and negative electrode 12, to which these lead members are respectively connected, and then the resulting workpiece is wound to yield electrode group 10 as illustrated in FIG. 3, which has one end surface from which the lead members are exposed. An outermost periphery of electrode group 10 is fixed with fastening tape 14.

Next, as illustrated in FIG. 2, electrode group 10 is housed, together with a nonaqueous electrolytic solution (not illustrated), in bottomed cylindrical container 101 having an opening. Lead wires 104A and 104B are led out from sealing body 102. Sealing body 102 is disposed in the opening in container 101 to seal container 101. Specifically, container 101 is, at its part near an end of the opening, processed inward by drawing, and the opening end is curled to swage sealing body 102. Sealing body 102 is formed of, for example, an elastic material containing a rubber component.

In the above-mentioned exemplary embodiment, a wound-type electrochemical device having a cylindrical shape has been described. However, the application scope of the present invention is not limited to the wound electrochemical device. Thus, the present invention can also be applied to a rectangular wound-type or a stacked-type electrochemical device.

EXAMPLES

Hereinafter, the present invention will be described in more detail with reference to Examples. The present invention, however, is not limited to Examples.

Example 1

(1) Preparation of positive electrode

A laminate was prepared in which a carbon layer (thickness: 2 μm) containing carbon black was formed onto each surface of an aluminum foil piece with a thickness of 30 μm. Meanwhile, an aqueous aniline solution containing aniline and sulfuric acid was prepared.

The laminate and a counter electrode were immersed in the aqueous aniline solution, and subjected to electrolytic polymerization at a current density of 10 mA/cm$^2$ for 20 minutes to deposit a film of a conductive polymer (polyaniline) doped with sulfate ions ($SO_4^{2-}$) onto the carbon layer of each of the surfaces of the laminate.

The conductive polymer doped with the sulfate ions was reduced for dedoping from the sulfate ions used for the doping. The reduction was carried out by applying a voltage while the laminate with the conductive polymer films formed was immersed in an aqueous solution containing an oxalic acid as a reductant at a concentration of 0.1 mol/L. In this way, an active layer including the conductive polymer was formed. Next, the active layer was sufficiently washed, and then dried. The active layer had a thickness of 35 μm per surface of the laminate.

(2) Fabrication of Negative Electrode

A copper foil piece having a thickness of 20 μm was prepared as a negative current collector. Meanwhile, mixed powder containing 97 parts by mass of hard carbon, 1 part by mass of carboxycellulose, and 2 parts by mass of styrene butadiene rubber was kneaded and mixed with water at a ratio by mass of 40:60 (mixed powder:water) to prepare a negative electrode mixture paste. The negative electrode mixture paste was applied to both surfaces of the negative current collector, and dried to yield a negative electrode having negative electrode material layers. The negative electrode material layers each have a thickness of 35 μm, and disposed, respectively, on both surfaces of this electrode. Next, a metal lithium layer was formed on the negative electrode material layer so that an amount of this metal lithium layer is calculated to adjust the negative electrode potential in the electrolytic solution after completion of the pre-doping to less than or equal to 0.2 V relative to that of metal lithium.

(3) Preparation of Electrode Group

A lead tab was connected to each of the positive electrode and the negative electrode. Thereafter, as illustrated in FIG. 3, separators each made of a cellulose nonwoven fabric (thickness of 35 μm) were laminated alternately onto the positive electrode and the negative electrode. The resultant laminate was wound to form an electrode group.

(4) Preparation of Nonaqueous Electrolytic Solution

To a mixture of propylene carbonate and dimethyl carbonate at a volume ratio of 1:1, 0.2% by mass of vinylene carbonate was added to prepare a solvent. LiPF$_6$ as a lithium salt was dissolved in the resulting solvent at a predetermined concentration to prepare a nonaqueous electrolytic solution containing hexafluorophosphate ions ($PF_6^-$) as anions.

(5) Preparation of Electrochemical Device

The electrode group and the nonaqueous electrolytic solution were housed in a bottomed case having an opening to assemble an electrochemical device as illustrated in FIG. 2. Thereafter, the electrochemical device was aged at 25° C. for 24 hours while a charging voltage of 3.8 V was applied to between terminals of the positive electrode and the negative electrode, so as to advance pre-doping of the negative electrode with lithium ions. The resulting electrochemical device was evaluated in accordance with methods described below. Table 1 shows the evaluation results collectively.

(Evaluation Methods)
(1) IR Spectrum Measurement

With the use of an FT-IR measuring apparatus, an IR spectrum was measured for the active layer of the prepared positive electrode. The IR spectrum is measured after fully charging the electrochemical device at a rated voltage of 3.8 V, then extracting the positive electrode, and sufficiently washing and drying the positive electrode. As a result, the first peak derived from the quaternized nitrogen atom was observed around 1150 $cm^{-1}$, and the second peak derived from the benzenoid structure was observed around 1480 $cm^{-1}$ to 1500 $cm^{-1}$. From the IR spectrum, the respective absorbances of the first peak and second peak were determined, and the ratio ($=I_1/I_2$) of the absorbance of the first peak to the absorbance of the second peak was calculated.

In the IR spectrum for the active layer according to Example 1, the absorbance ratio $I_1/I_2$ was 1.25.

(2) Float Property (Capacitance Change Rate ΔC)

The discharged capacitance (initial capacitance) was measured when the electrochemical device was charged at a voltage of 3.8 V, and then discharged down to 2.5 V.

The discharged capacitance was measured in the same way as mentioned above after the electrochemical device was continuously charged (float charging) for 1000 hours under the condition of 3.6 V at 60° C. And then a rate ΔC (%) of the discharged capacitance to the initial capacitance was calculated in the case of regarding the initial capacity as 100%. As the ΔC is closer to 100%, it is indicated that decrease in capacitance in the case of float charging is smaller, and reliability of the electrochemical device is higher.

Example 2

In the same way as in Example 1 except that the oxalic acid was changed to a formic acid so that the absorbance ratio I1/I2 was changed, an electrochemical device was prepared and evaluated. In an IR spectrum for the active layer, the absorbance ratio I1/I2 was 0.86.

Example 3

In the same way as in Example 1 except that the oxalic acid was changed to an ascorbic acid so that the absorbance ratio I1/I2 was changed, an electrochemical device was prepared and evaluated. In an IR spectrum for the active layer, the absorbance ratio I1/I2 was 1.25.

Comparative Example 1

The absorbance ratio I1/I2 was changed by immersing a laminate with conductive polymer films formed in an aqueous solution of hydrazine instead of the aqueous solution of oxalic acid. In the same way as in Example 1 except for the foregoing, and an electrochemical device was prepared and evaluated. In an IR spectrum for the active layer, the absorbance ratio I1/I2 was 0.18.

FIGS. 4A to 4D respectively show the IR spectra for the active layers of the positive electrodes obtained according to Examples 1 to 3 and Comparative Example 1. Examples 1 to 3 correspond to A1 to A3, whereas Comparative Example 1 corresponds to B1. In each of these figures, the part surrounded by a dotted circle corresponds to the first peak derived from the quaternized nitrogen atom. And the second peak derived from the benzenoid structure corresponds to a peak appearing around 1480 $cm^{-1}$ to 1500 $cm^{-1}$. As shown in the figures, in the IR spectrum for the active layer according to the Comparative Example, the second peak is much higher than the first peak. On the other hand, in the IR spectra for the active layers according to the Examples, the absorbance of the first peak is close to the absorbance of the second peak. The IR spectra in the Examples are significantly different from the IR spectrum in the Comparative Example.

Table 1 shows evaluation results for the float property (capacitance change rate) in Examples 1 to 3 and Comparative Example 1. Examples 1 to 3 correspond to A1 to A3, whereas Comparative Example 1 corresponds to B1.

TABLE 1

| | Capacitance change rate ΔC (%) |
|---|---|
| A1 | 90 |
| A2 | 88 |
| A3 | 75 |
| B1 | 64 |

As shown in Table 1, the decrease in capacitance change rate ΔC in the case of float charging is suppressed in the Examples where the ratio $I_1/I_2$ is more than or equal to 0.3, as compared with the Comparative Example where the ratio $I_1/I_2$ is less than 0.3. More specifically, it is understood that the decline in float property is suppressed in the Examples, as compared with the comparative example.

The electrochemical device according to the present invention is excellent in float property, and thus suitable as various electrochemical devices, in particular, power supplies for backup.

The invention claimed is:

1. An electrochemical device comprising:
a positive electrode including a positive current collector and an active layer disposed on the positive current collector, the active layer including a conductive polymer;
a negative electrode including a negative current collector and a negative electrode material layer disposed on the negative current collector, the negative electrode material layer being capable of occluding and releasing lithium ions; and
an electrolytic solution containing an anion that is capable of doping into and dedoping from the conductive polymer in accordance with charging and discharging, wherein:
the conductive polymer contains at least one material selected from the group consisting of polyaniline and a derivative of polyaniline, the at least one material being doped with sulfate ions ($SO_4^{2-}$),
an infrared absorption spectrum of the active layer exhibits a first peak and a second peak, the first peak being derived from a quaternized nitrogen atom of the polyaniline or the derivative of polyaniline, the second peak being derived from a benzenoid structure of the polyaniline or the derivative of polyaniline,
the first peak appears in a range from 1100 $cm^{-1}$ to 1200 $cm^{-1}$, inclusive,
the second peak appears in a range from 1450 $cm^{-1}$ to 1550 $cm^{-1}$, inclusive,
a ratio of an absorbance of the first peak to an absorbance of the second peak is more than or equal to 0.3, and the positive electrode further includes a carbon layer disposed between the positive current collector and the active layer.

2. The electrochemical device according to claim 1, wherein the electrolytic solution contains a lithium hexafluorophosphate.

3. The electrochemical device according to claim 1, wherein a thickness of the carbon layer ranges from 1 μm to 20 μm, inclusive.

4. The electrochemical device according to claim 1, wherein the ratio of the absorbance of the first peak to the absorbance of the second peak is more than or equal to 0.3 and less than or equal to 3.0.

5. The electrochemical device according to claim 1, wherein the quaternized nitrogen atom is quaternized by the anion contained in the electrolytic solution.

\* \* \* \* \*